United States Patent [19]

Clement

[11] 4,429,783
[45] Feb. 7, 1984

[54] SCRAPER BLADE ASSEMBLY FOR CENTRAL CHAIN SCRAPER CONVEYORS

[75] Inventor: Anton Clement, Iserlohn-Letmathe, Fed. Rep. of Germany

[73] Assignee: August Thiele, Iserlohn-Kalthof, Fed. Rep. of Germany

[21] Appl. No.: 296,184

[22] Filed: Aug. 25, 1981

[30] Foreign Application Priority Data

Oct. 4, 1980 [DE] Fed. Rep. of Germany ....... 3038799

[51] Int. Cl.$^3$ .............................................. B65G 19/24
[52] U.S. Cl. ................................................. 198/731
[58] Field of Search .......................... 198/731, 733, 728

[56] References Cited

U.S. PATENT DOCUMENTS 4,265,359 5/1981 Temme ................................ 198/731

FOREIGN PATENT DOCUMENTS 2031927 1/1972 Fed. Rep. of Germany .
1937608 11/1982 Fed. Rep. of Germany ...... 198/731

Primary Examiner—Joseph E. Valenza
Assistant Examiner—Dennis J. Williamson
Attorney, Agent, or Firm—Michael J. Striker

[57] ABSTRACT

A scraper blade assembly for use in a central chain scraper conveyor, especially in a double central chain scraper conveyor, includes a lower and an upper blade part forming respective channels that complement each other at a parting plane between the blade parts into openings for receiving transversely spaced portions of respective horizontal links of the chains. The blade parts have overlapping portions one of which extends across the parting plane and is received in a correspondingly configurated recess juxtaposed with the other overlapping portion. The overlapping portions are provided with aligned holes at least one of which is elongated in direction normal to the parting plane, and bolts extend through these holes parallel to the advancement direction of the conveyor to connect the blade parts to one another. One of the blade parts has additionally one or two further bolts connected thereto, these additional bolts extending normal to the parting plane and into corresponding additional holes in the other blade part. A nut is threaded on each of the additional bolts and connects the same to the other blade part in such a manner that the blade parts are unable to bend at the critical region of the openings for the chain link portions and hence the latter are safely clamped between the blade parts.

17 Claims, 16 Drawing Figures

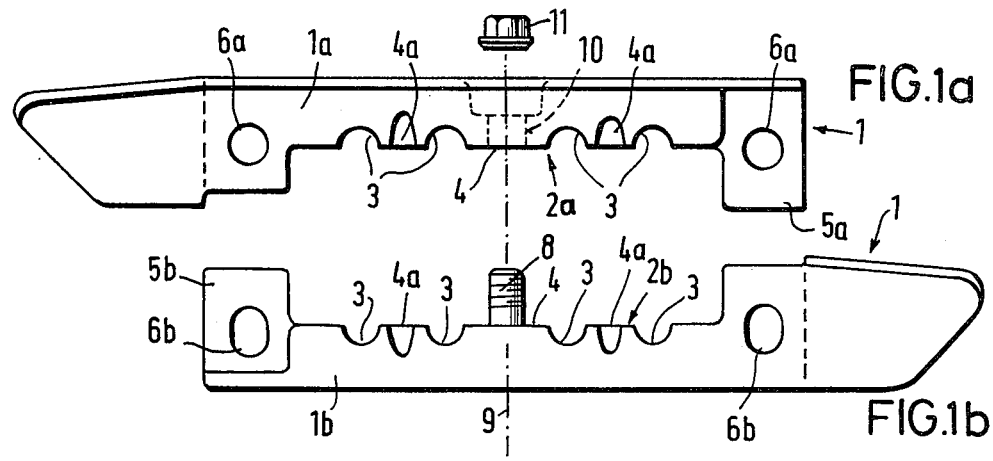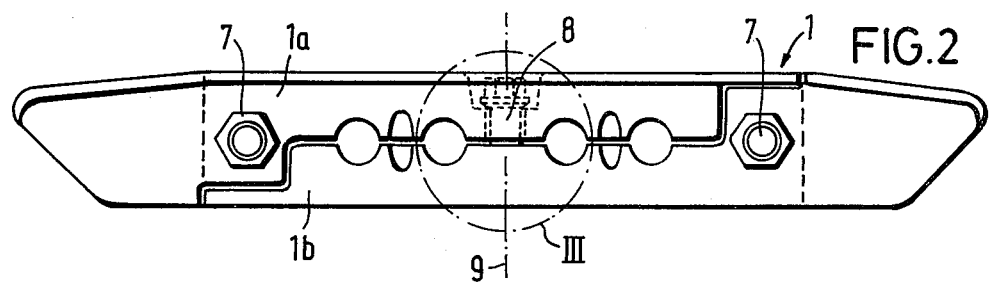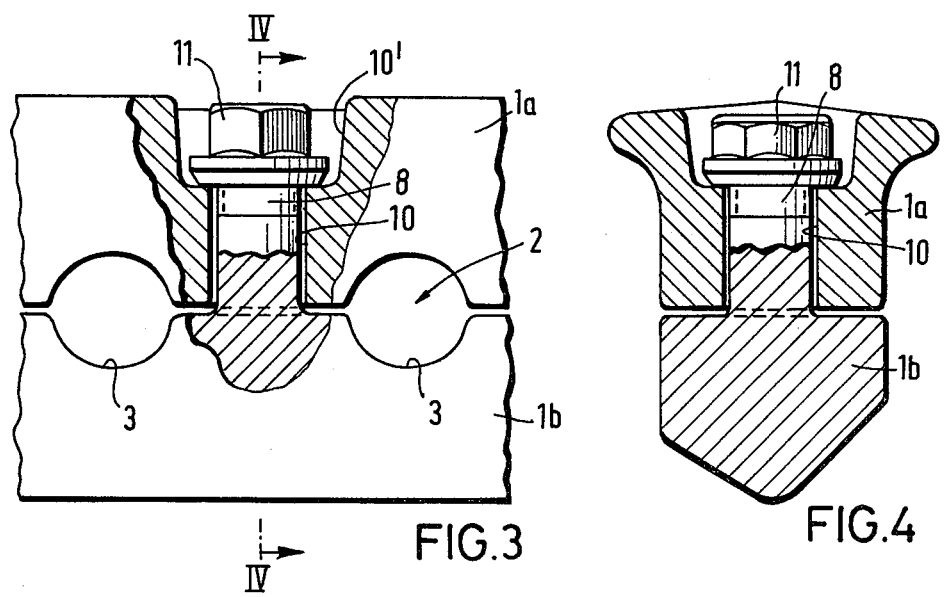

SCRAPER BLADE ASSEMBLY FOR CENTRAL CHAIN SCRAPER CONVEYORS

BACKGROUND OF THE INVENTION

The present invention relates to scrapper blade assemblies for use in scraper chain conveyors with centrally disposed chains in general, and more particularly to a scraper blade assembly which is especially suited for use in double central chain scraper conveyors.

Scraper chain conveyors basically fall into two categories: double lateral chain scraper conveyors where the scraper blade is flanked by the laterally disposed chains, and central chain scraper conveyors were one or more chains are disposed at the center of the scraper blades in a symmetrical arrangement. The distribution of forces, and, consequently, the deformation of the respective scraper blade is completely different in each of these categories, so that different design considerations are present and scraper blade constructions used in lateral chain scraper conveyors are inappropriate for use in central chain scraper conveyors, and vice versa. Therefore, these scraper conveyors have traditionally been developed along separate lines.

There are already known scraper blade assemblies for use in double central chain scraper conveyors, which have similar shapes but different constructions. One construction of a scraper blade assembly of this type is known from the German Pat. No. 2,031,927. This assembly includes two discrete scraper blade parts which are respectively disposed at one and at the other side of a parting plane and which together define respective openings for receiving transversely spaced portions of a respective chain link of a centrally disposed chain extending along the parting plane. The parting plane bisects the openings so that each of the blade parts has respective channels which are separated from one another by respective lands. The blade parts are provided, laterally outwardly of the channels, with respective overlapping portions which together form respective sets of such portions, one overlapping portion in each of the sets extending across the parting plane and being received in a recess which is juxtaposed with a corresponding overlapping portion of the same set provided on the respectively other blade part. The blade parts are provided, at the regions of the overlapping portions, with through holes which are aligned with one another in the respective set and at least one of which in each set is elongated indirection normal to the parting plane. Connecting bolts extend through the respectively aligned holes substantially parallel to the parting plane and connect the blade parts to one another in such a manner that the size of a gap between the blade parts along the parting plane can be adjusted, due to the elongated configuration of the one through hole in each set, and thus the transversely spaced portions of the respective chain link can be clamped in the respective openings between the surfaces bounding the respective channels in the two blade parts.

In central chain scraper blade assemblies of this type, the lower blade part, that is, the blade part which is disposed below the parting plane as considered in its position of use in the central chain scraper conveyor, must taper in the downward direction so as to be able to unproblematically penetrate into corresponding recesses provided in the chain sprockets. However, this tapering results in a weakening of the cross-section of the lower scraper blade part at the region of the chain link receiving openings, so that the chain links received in the openings and extending along the parting plane are free to move in these openings in directions parallel to the parting plane and especially in the longitudinal directions of the scraper blade assembly after a certain period of operation of the central chain scraper conveyor, whether the latter is of the single-chain type in which the chain is located centrally of the scraper blade assembly, or of the double-chain type in which the two central chains are arranged symmetrically with respect to a central plane of the scraper blade assembly.

Even though experience has shown that this relative movability of the chain links with respect to the scraper blade assembly does not have a detrimental influence on the function and operation of the scraper blade assembly, attempts have still been made in the past to restore the clamping action of the blade parts on the chain links accommodated therebetween, in an attempt to prolong the useful life of the respective scraper blade assembly up to the time that the wear thereof is so great as to necessitate replacement. One of the methods used in the past for achieving this purpose was to provide welded formations in the respective grooves or channels of the cooperating scraper blade parts to thereby eliminate the play and restore the clamping action.

On the other hand, there have also become known, for instance, from the published German application No. 27 59 414, scrpaer blade assemblies for central chain scraper conveyors including two scraper blade parts which together form a flat chain bed for the respective chain links, wherein the two scraper blade parts are connected to one another by means of connecting bolts extending normal to the parting plane extending through the chain bed. However, even in this arrangement, the cross-section of the lower blade part is reduced at the region of the chain bed, and the connecting bolts engage the two scraper blade parts at locations which are situtated to the two longitudinal sides of the scraper blade assembly from the chain bed, so that the scraper blade parts can bend at the region of the chain bed and thus reduce the clamping action of the scraper blade parts on the centrally disposed chain links accommodated therebetween, with the same undesirable result as discussed above.

SUMMARY OF THE INVENTION

Accordingly, it is a general object of the present invention to avoid the disadvantages of the prior art.

More particularly, it is an object of the invention to so construct a scraper blade assembly for use in central chain scraper conveyors as not to be possessed of the disadvantages of the conventional assemblies of this type.

Yet another object of the invention is to develop a scraper blade assembly of the type here under consideration in which the possibility of development of lateral play between the assembly and the associated centrally disposed chain link or links is reduced to a minimum if not eliminated altogether.

It is a concomitant object of the invention to so design the scraper blade assembly as to be simple in construction, easy to manufacture and assemble, and reliable in operation nevertheless.

An additional object of the invention is to provide a scraper blade assembly including two blade parts in which bending of the blade parts away from each other is prevented in a simple manner.

In pursuance of these objects and others which will become apparent hereafter, one feature of the present invention resides in a scraper blade assembly for use in a central chain scraper conveyor including at least one chain consisting of a plurality of consecutive chain links, especially in a double central chain scraper conveyor, which scraper blade assembly comprises two discrete elongated scraper blade parts each substantially disposed at one side of a parting plane, the blade parts having at least two sets of mutually overlapping portions at least one of which in each set extends across the parting plane and wherein the sets are spaced from one another longitudinally of the blade parts; means for bounding on each of the blade parts at least one pair of channels which are situated between the sets of overlapping portions and which open onto the parting plane so that the associated channels on the two blade parts complement each other into confining openings for portions of a respective centrally disposed chain link which extend along the parting plane at a spacing longitudinally of the blade parts; and means for connecting the blade parts to one another, including aligned through holes in the overlapping portions of each set, the holes extending along the parting plane and transversely to the elongations of the blade parts, connecting bolts respectively extending through these holes, at least one additional hole provided ine one of the blade parts, the additional hole being situated between the sets of overlapping portions and extending substantially normal to the parting plane, at least one additional bolt connected to the other of the blade parts and extending across the parting plane into the additional hole, and at least one nut threaded onto the additional bolt and engaging the one blade part at the additional hole.

As a result of the fact that the two blade parts are connected to one another at the region of the openings for the spaced portions of the chain link or links, in addition to their connection by the two bolts which extend substantially parallel to the parting plane through the aligned holes in the overlapping portions of the two blade parts, also by means of at least the one additional bolt which extends at the region of one of the lands between the channels for the transversely spaced portions of the respective centrally disposed chain links through a respective bore which is disposed either along the common longitudinal plane of symmetry of the central chain or chains or at a predetermined distance therefrom longitudinally of the scraper blade assembly and extends substantially normal to the parting plane, there is achieved the advantage that the two scraper blade parts are rigidly connected to one another not only as considered in the direction of advancement of the central chain or chains, but also, and additionally, in the direction normal to the advancement direction and to the parting plane. The additional connection by the additional bolt occurs at the critical regions adjacent to the openings which accommodate the transversely spaced portions of the respective centrally disposed link or links, so that the surfaces bounding the channels for these transversely spaced portions securely clamp such portions between themselves at all times, and such secure clamping action is not discontinued even after an extended period of operation of the central chain scraper conveyor.

The aforementioned one overlapping portion, which extends across the parting plane, is provided on a first of the blade parts in the respective set, while the respectively second of the blade parts has at least another of the overlapping portions and means for bounding a recess juxtaposed with the latter and receiving the one overlapping portion. It is further advantageous when at least one of the aligned holes in each of the sets of overlapping portions is constituted by a slot which is elongated in direction normal to the parting plane. These expedients assure, on the one hand, that the blade parts are prevented from moving relative to one another in the longitudinal direction of the scraper blade assembly once assembled and, on the other hand, that the spacing between the scraper blade parts, or the size of the gap present therebetween at the parting plane, can be freely adjusted during the establishment of the clamping engagement of the blade parts with the centrally disposed chain link or links received between these parts.

The additional bolt may advantageously be of one piece with the above-mentioned other blade part, especially with the lower blade part. In this respect, it is especially advantageous when the other blade part is a forged product, and when the additional bolt is constituted by an integrally forged portion of the other blade part which is subsequently formed with an external thread adapted to conformingly engage an internal thread of the aforementioned nut. It is further advantageous to provide this nut with a self-locking threaded insert, and to enlarge that end of the additional hole in the one blade part which is remote from the parting plane to provide a space for recessedly receiving the nut.

Instead of providing, especially forging, the additional bolt in one piece with the other blade part, it is also possible, and contemplated in accordance with a further advantageous aspect of the present invention, to form an auxiliary hole in the other blade part, the auxiliary hole being aligned with the additional hole in the asssembled condition of the scraper blade assembly. Then, the additional bolt is provided as an element separate from the other blade part and has a head which is situated at that end of the auxiliary hole which is remote from the parting plane, and a stem which extends from the head through the auxiliary hole and across the parting plane into the additional hole. Advantageously, the head has a non-circular cross-section, and the other blade part includes abutment means at that end of the auxiliary hole which is remote from the parting plane, the abutment means cooperating with the non-circular head of the additional connecting bolt in preventing the latter from turning in the auxiliary and additional holes about the axis of the stem. A particularly simple construction is obtain when the cross section of the head is rectangular, and when the abutment means includes a pair of abutment surfaces extending longitudinally of the other blade part and engaging the cross-sectionally rectangular head of the additional connecting bolt.

Under certain circumstances, particularly when the distance between the openings which receive the adjacent portions of two neighboring chain links as measured on the respective lands separating such openings is too small for arranging at this location an additional bolt having a sufficient strength and also a cylindrical stem throughout, then it is advantageous to arrange an additional bolt at this location having a stem of an increased circular cross-section and thus a strength exceeding that which would otherwise be necessary at this location, so that the stem of this additional bolt extends across at least one of the adjacent openings and preferably across both of them, and to provide the stem with at least one recess, but preferably two lateral recesses each aligned with and forming a continuation of the respective opening in the two blade parts. This can be done whether the bolt is forged integrally with the other blade part or is a separate element non-rotatably supported on the other part in such a position that the lateral recess or recesses is or are aligned with the respective opening.

If the width of the lands as considered in the longitudinal direction of the blade parts is too small to accommodate the additional bolt at the location coinciding with the longitudinal symmetry plane of the scraper blade assembly, it is also possible, according to another advantageous facet of the present invention to employ, instead of the single additional connecting bolt, two such additional bolts, and to arrange such bolts respectively at those lands which separate the openings that accommodate the transversely spaced portions of one and the same centrally disposed chain link from one another. Even here, the additional bolts can either be forged integrally with the other blade part, or may be separate elements, such as bolts with rectangular heads and with stems which are received in respectively associated auxiliary holes in the other blade part and additional holes provided in the one blade part, and having an associated nut threaded thereon, the auxiliary and additional holes again extending substantially normal to the parting plane.

In order to be able to overcome the effects of wear which become apparent at the surfaces bounding the respective channels in the two blade parts despite the provision of the additional connection active in accordance with the present invention in the direction normal to the parting plane, at least under certain circumstances and/or after an extended period of use of the central chain scraper blade assembly, it is also proposed, in accordance with an additional advantageous concept of the present invention, to equip each of the blade parts with at least one lining which is exchangeably connected to the remainder of the respective blade part and bounds one or more of the channels. Advantageously, the lining includes a pair of semi-annular portions each bounding one of the channels for accommodating the transversely spaced portions of the same chain link, and a flat connecting portion interconnecting the semi-annular portions and juxtaposed with the respective land that separates the respective channels in the remainder of the respective blade part. Thus, the lining has a generally W-shaped or omega-shaped configuration. When two of the additional bolts are being used for connecting the two blade parts of a double central chain scraper conveyor, each situated at one of the lands which are superimposed with the respective flat portions of the respective linings, each of the flat portions is provided with a through aperture for the passage of the stem of the respective additional bolt therethrough. The respective lining can be connected to the remainder of the respective blade part either by means of pins, or by being welded thereto at least along its edges.

The novel features which are considered as characteristic of the invention are set forth in particular in the appended claims. The improved central chain scraper blade assembly itself, however, both as to its construction and to its mode of operation, together with additional features and advantages thereof, will be best understood upon perusal of the following detailed description of certain specific embodiments with reference to the accompanying drawing.

BRIEF DESCRIPTION OF THE DRAWING

FIGS. 1a and 1b is an exploded view of a scraper blade assembly according to the invention including two blade parts;

FIG. 2 is a front elevational view of the assembly of FIGS. 1a and 1b in its assembled condition;

FIG. 3 is a partially sectional view of a detail III from FIG. 2;

FIG. 4 is a cross-sectional view taken on line IV—IV of FIG. 3;

DETAILED DESCRIPTION OF THE PREFERRED EMBODIMENTS

Figure 5:
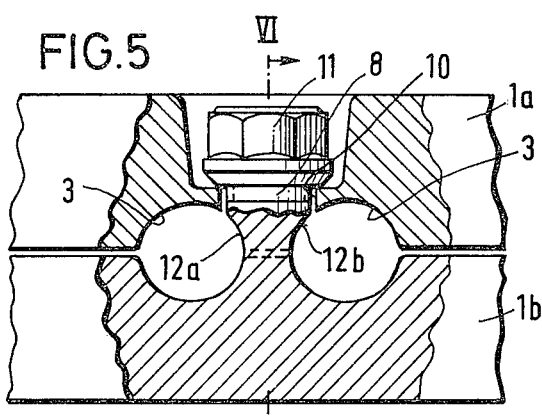
FIG. 5 is a view similar to FIG. 3 but showing a modification.

Referring now to the drawings in detail, and first to FIGS. 1a, 1b and 2 thereof, it may be seen that the reference numeral 1 has been used therein to identify a central chain scraper blade assembly in its entirety. In the following description, reference will be had to various directions, and it is to be understood that these references relate to the position of the assembly 1 as shown in the drawings, not necessarily to that assumed during the use, at least not at all times.

The scraper blade assembly 1 includes an upper blade half or part 1a and a lower blade half or part 1b as they are configured for use in double central chain scraper conveyors including two chains each consisting of a plurality of consecutive interfitted substantially O-shaped links which alternatingly extend along a horizontal and a vertical plane of the respective chain and each of which has two portions which are transversely spaced from one another.

The two blade parts 1a and 1b together define a bed 2 for the centrally disposed chain links, and a parting plane which essentially subdivides the assembly into the upper and lower halves 1a and 1b passes through the chain link bed 2, subdividing the same into an upper central chain link bed half 2a and a lower central chain link bed half 2b. The respective central chain link bed halves 2a and 2b include respective channels 3 which are separated from one another by respective lands 4 and 4a, always two associated ones of the channels 3 being adapted to receive the transversely spaced portions of the respective horizontally extending centrally disposed chain link and the channels complementing each other into openings which may be seen in FIG. 2.

As may be seen particularly in FIGS. 1a and 1b, each of the central chain scraper blade parts 1a and 1b is provided, at a location which is longitudinally outwardly spaced from the respective central chain link bed half 2a or 2b, with an overlapping portion 5a and 5b extending substantially vertically, that is, normal to the parting plane, toward the respectively other scraper blade part 1b or 1a to overlap an associated overlapping portion of the latter. As shown in broken lines in FIGS. 1a and 1b, the respectively other scraper blade part 1b or 1a has a recess which is juxtaposed with the overlapping portion thereof and which, in the assembled condition, receives the respectively associated overlapping portion 5a or 5b. The cooperating overlapping portions thus form respective sets which complement one another so that the total thickness of the assembly 1 at the region of the overlapping portions 5a and 5b is substantially the same as outside this region. The overlapping portions 5a and 5b, as well as the associated overlapping portions of the respectively other blade part 1b or 1a, are provided with respective through holes 6a and 6b which are respectively aligned with one another so as to permit respective connecting bolts 7 to pass therethrough. In the assembled condition illustrated in FIG. 2, the connecting bolts 7 extend substantially horizontally and in the direction of movement of the central chain scraper conveyor. At least one of the aligned bores 6a and 6b is constituted by an elongated slot the elongation of which extends substantially normal to the parting plane, so as to render it possible to move the scraper blade parts 1a and 1b toward one another during the assembling operation until the transversely spaced portions of the respective central chain links are securely clamped between the surfaces bounding the respective channels 3.

As may also be seen from FIG. 2, and in more detail from FIGS. 3 to 10, the two blade parts 1a and 1b are connected to one another, in addition to the connection by the horizontally extending bolts 7, also by at least one additional bolt 8 which extends substantially normal to the parting plane and thus to the advancement direction of the central chain scraper conveyor. Thus, while the bolts 7 reinforce the assembly 1 against bending in the advancement direction, the additional bolt 8 reinforces the assembly 1 against bending normal to the parting plane.

In the construction of FIGS. 1a to 10, only a single additional connecting bolt 8 s provided which is arranged in the middle of the lands 4 which respectively separate from one another the bed halves 2a, 2b for the horizontal central chain links of the two centrally disposed conveyor chains used in a double central chain scraper conveyor. In the construction depicted in FIGS. 1a to 6, the bolt 8 is forged integrally with the lower blade part 1b, originally as a pin, and is disposed along the common longitudinal plane of symmetry of the centrally disposed conveyor chains intermediate the same. The bolt 8 extends into a hole 10 provided therefor in the upper blade part 1a and has a threaded portion onto which there is threaded a tensioning nut 11. The hole 10 has an end portion 10' of an enlarged cross-section at its end which is remote from the parting plane, the enlarged end portion 10' recessedly receiving the tensioning nut 11 in the assembled condition of the scraper blade assembly 1. The tensioning nut 11 is provided, in conventional manner, with a self-locking insert of a synthetic plastic material.

Figure 6:
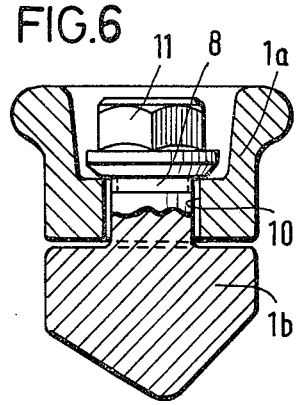
FIG. 6 is a cross-sectional view taken on line VI—VI of FIG. 5.
Figure 7:
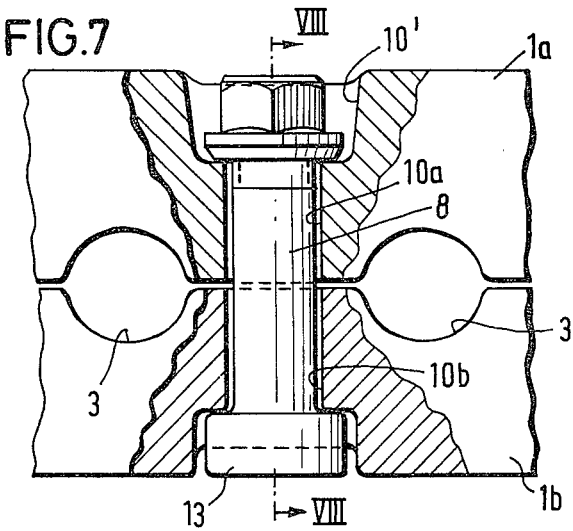
FIG. 7 is a view similar to FIG. 3 but showing another modification.
Figure 8:
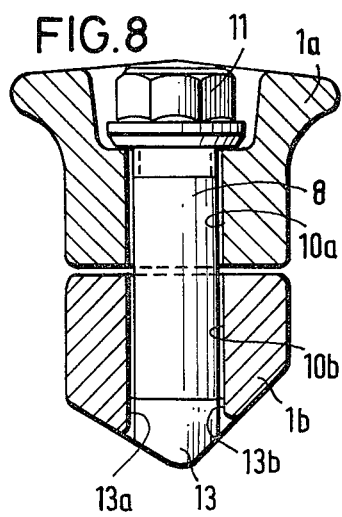
FIG. 8 is a cross-sectional view taken on line VIII—VIII of FIG. 7.

Whereas the lands 4 on the two central chain link bed halves 2a, 2b have a sufficient width as considered in the longitudinal directiuon of the respective blade parts 1a, 1b in the construction shown in FIGS. 1a to 4 for the central arrangement of the bolt 8 of a sufficient strength extending between the two scraper blade parts 1a, 1b, the corresponding distance in the construction of FIGS. 5 and 6 is so small that the stem of the bolt 8 would extend across the openings formed by the channels 3, were it not for the provision of lateral recesses 12a, 12b therein, the latter forming continuations of the above-mentioned openings in the assembled condition and partially receiving the transversely spaced portions of the respective centrally disposed chain links which are accommodated in the respective openings. Despite the provision of the lateral recesses 12a and 12b, the stem of this bolt 8 still has a strength sufficient to securely connect the blade parts 1a and 1b to one another at this region, especially since the diameter of the stem may be selected in such a manner as to compensate for the weakening of the structure thereof by the lateral recesses 12a and 12b. In any event, the strength of the bolt 8 equipped with the lateral recesses 12a and 12b exceeds that of a bolt of a diameter corresponding to the width of the lands 4 under these circumstances and devoid of such leteral recesses.

The situation is analogous in the constructions shown in FIGS. 7 to 10. In the construction illustrated in FIGS. 7 and 8, there is provided, instead of the above-discussed bolt which is integrally forged with the lower blade part 1b, a hammer-head-type bolt 8 which extends transversely to the parting plane, that is, vertically and transversely to the advancement direction of the central chain scraper conveyor, through aligned holes 10a, 10b respectively provided in the upper and lower blade parts 1a, 1b. The hole 10b in the lower blade part 1b is provided, for the reception of a hammer-head-shaped bolt head 13, with lateral abutment surfaces 13a, 13b which extend in the longitudinal direction of the scraper blade assembly 1 at the two opposite sides of the head 13. On the other hand, the upper end of the hole 10a in the upper blade part 1a is enlarged for recessedly receiving the nut 11, in the same manner as discussed above in connection with FIGS. 1a to 6.

Figure 9:
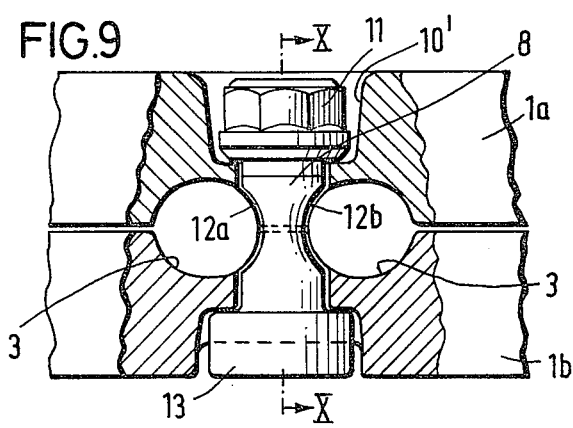
FIG. 9 is a view similar to FIG. 3 but showing yet another modification.
Figure 10:
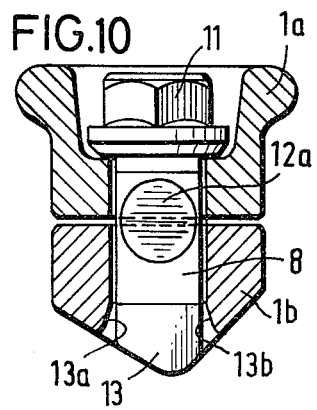
FIG. 10 is a cross-sectional view taken on line X—X of FIG. 9.

In the construction illustrated in FIGS. 9 and 10, the distance between the channels 3 on the two central chain link bed halves 2a, 2b is again so small at the region of the lands 4 of the two scraper blade parts 1a, 1b that the hammer-head-type bolt 8 is provided with the lateral recesses 12a, 12b in its stem in the same manner and for the same purpose as discussed above in connection with FIGS. 5 and 6.

Figure 11:
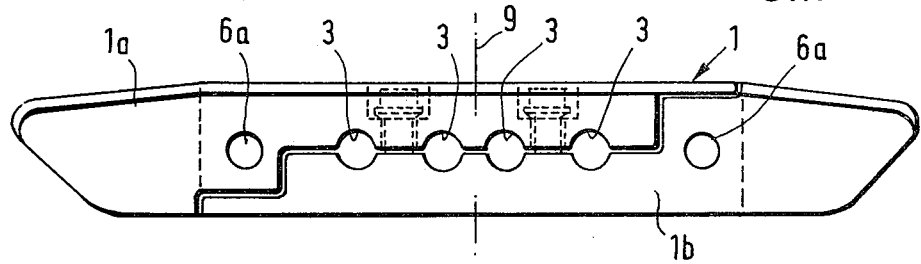
FIG. 11 is a view similar to FIG. 2 but showing a modified form of the scraper blade assembly.
Figure 12:
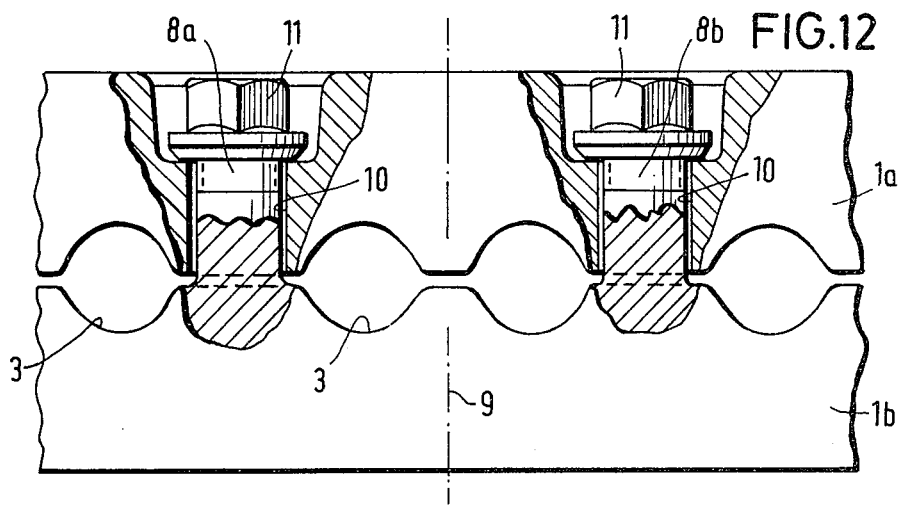
FIG. 12 is a partially sectional view of certain details of FIG. 11.
Figure 13:
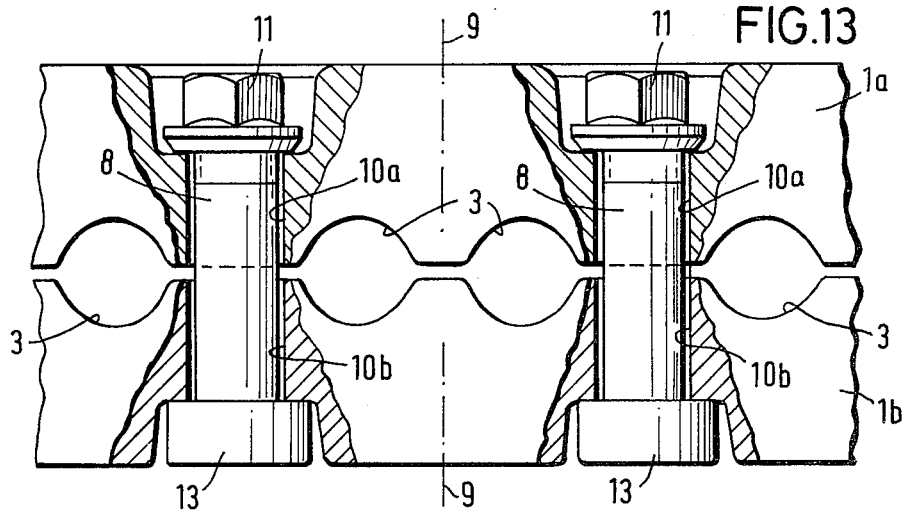
FIG. 13 is a view similar to FIG. 12 but showing a further modification.

In the constructions depicted in FIGS. 11 and 13 of the drawing, where the same or similar reference numerals have been used to identify corresponding parts, the distance between the channels 3 on the two central chain link bed halves 2a, 2b for the reception of the horizontal links of the two centrally disposed chains of the double central chain scraper conveyor is so small that a tensioning bolt 8 cannot be conveniently arranged at the common longitudinal plane of the chains. Thus, instead of the central arrangement of a single bolt 8, there are employed, in this construction, two pin-shaped bolts 8a and 8b which are respectively arranged at the one and at the other side of the longitudinal plane 9 of the chains. In the construction shown in FIG. 12, the two bolts 8a and 8b are forged integrally with the lower blade part 1b at the regions of the respective lands 4a and extend into the corresponding holes 10 provided in the upper blade part 1a, where they are again tensioned and connected to the upper blade part 1a by means of the corresponding recessed nuts 11.

In the construction according to FIG. 13, hammerhead-type bolts 8 are again being used instead of the forged bolts. The bolts 8 have stems which extend into respective holes 10a and 10b provided in the two scraper blade parts 1a, 1b. Here again, the holes 10a and 10b are enlarged at their ends remote from the parting plane for recessed accommodation of the hammer head 13, on the one hand, and of the nut 11, on the other hand, as explained above in connection with the description of the constructions depicted in FIGS. 1a to 10.

Figure 14:
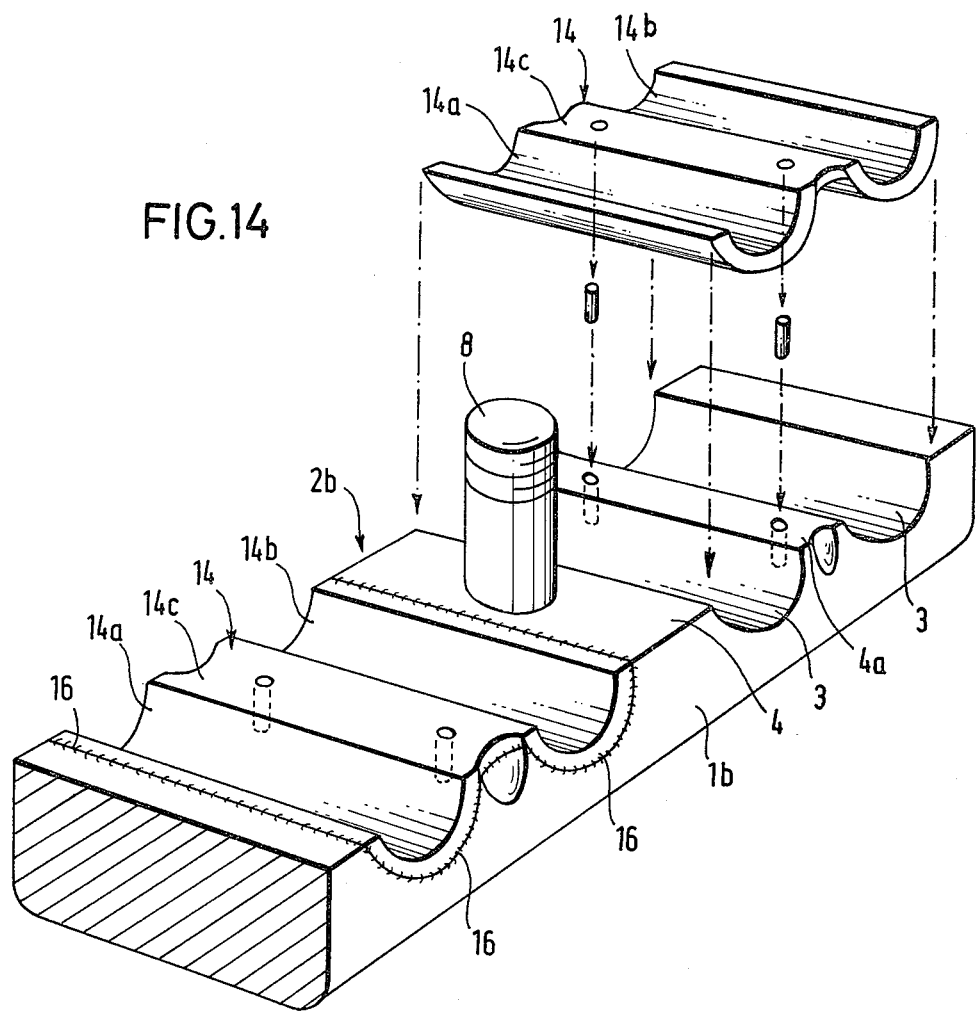
FIG. 14 is a perspective view of one of the blade parts of an assembly similar to that of FIG. 2 but equipped with linings at the regions of the beds for the respective chain links.
Figure 15:
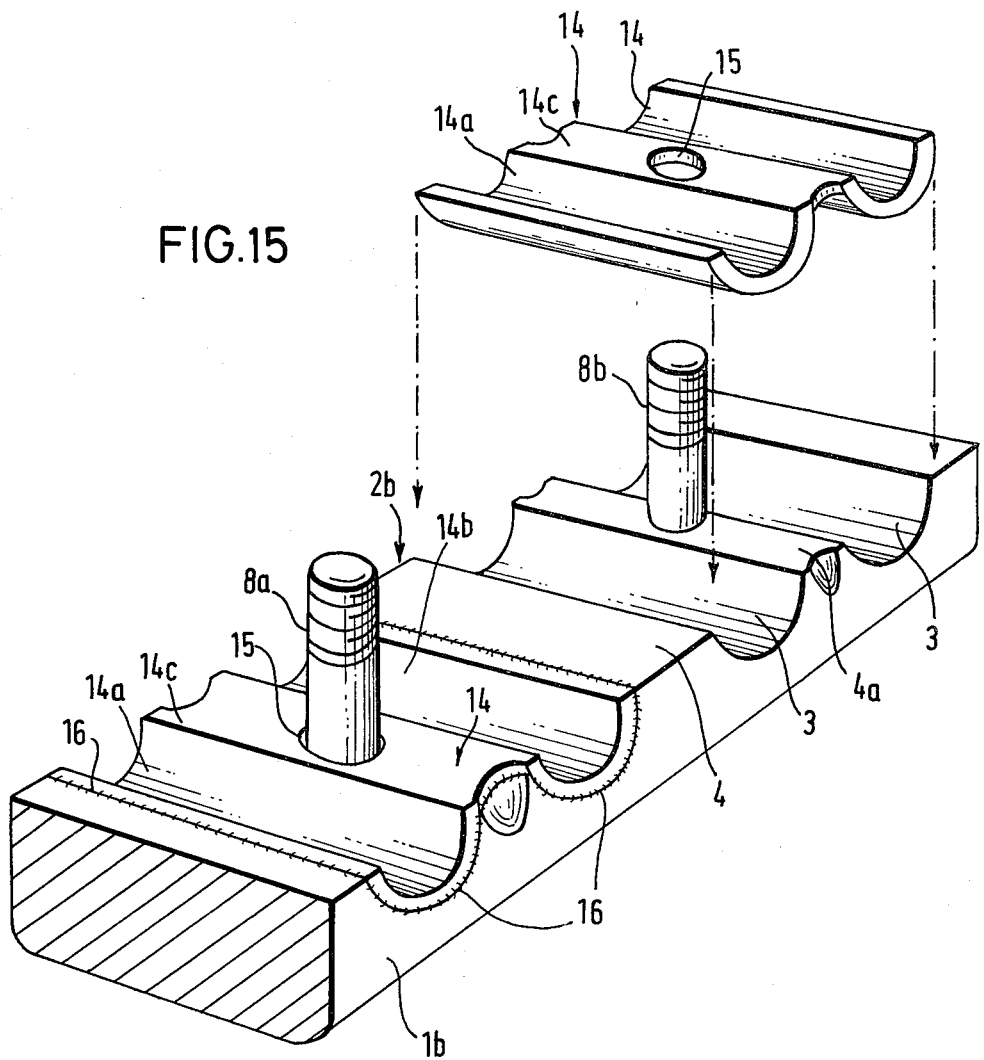
FIG. 15 is a view similar to FIG. 14 but showing one of the blade parts of an assembly similar to that of FIG. 11.

FIGS. 14 and 15 show, on the example of the lower blade part 1b, how the blade parts 1a and 1b can be provided with linings 14 cooperating with the respective central control chains. The respective lining 14 is exchangeably connected to the lower blade part 1b at the region of the respective channel or channels 3. The linings can be provided not only on the lower blade part 1b, but also on the upper blade part 1a, in the same or a similar manner. As shown, each of the linings 14 is constructed to cooperate with the respectively central chain link, and more particularly to accommodate the transversely spaced portions of the horizontal central chain link received in the respective central chain link bed 2. To this end, the lining 14 has a substantially W-shaped or omega-shaped configuration i.e., it includes a pair of semi-annular portions and a straight or flat connecting portion extending between and connected to, especially integral with the semi-annular portions. The two semi-annular portions are indicated at 14a and 14b, while the flat connecting portion is indicated at 14c. The semi-annular portions 14 and 14b are received in the respective channels 3, while the flat connecting portion 14c overlies the land 4a which separates these channels 3 from one another. If need be, the connecting portion 14c is provided with a vertical central bore 15 for passage of the respective stem of the bolt 8a, 8b or 8 connecting the two blade parts 1a, 1b to one another therethrough. In the construction shown in FIG. 14, the linings 14 are connected to the respective blade part 1b by means of pins, but they can also be connected, either instead or in addition, by being welded to the respective blade part 1a or 1b, at least along their edge zones. The welded connection is shown at 16 in FIGS. 14 and 15.

It will be understood that each of the elements described above, or two or more together, may also find a useful application in other types of arrangements differing from the type described above.

While the invention has been illustrated and described as embodied in a scraper blade assembly for double central chain scraper conveyors, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt if for various applications without omitting features that, from the standpoint of prior art, fairly constitute essential characteristics of the generic or specific aspects of my contribution to the art and, therefore, such adaptations should and are intended to be comprehended within the meaning and range of equivalence of the claims.

What is claimed as new and desired to be protected by Letters Patent is set forth in the appended claims:

1. A scraper blade assembly for use in a scraper chain conveyor including at least one centrally disposed chain consisting of a plurality of consecutive links, especially in a double central chain conveyor, comprising two discrete elongated scraper blade parts each substantially disposed at one side of a parting plane, said blade parts having at least two sets of mutually overlapping portions, said sets being spaced from one another longitudinally of said blade parts and at least one of said overlapping portions of each of said sets extending across said parting plane; means for bounding on each of said blade parts at least one pair of channels situated between said sets and opening onto said parting plane, the associated channels on said two blade parts complementing each other into confining openings for portions of a respective central chain link extending along said parting plane at a spacing longitudinally of said blade parts; and means for connecting said blade parts to one another, including aligned through holes in each of said sets, extending along said parting plane and transversely to the blade parts elongations, connecting bolts extending through said holes, at least one additional hole in one of said blade parts situated between said sets and extending substantially normal to said parting plane, at least one additional bolt connected to the other of said blade parts and extending across said parting plane into said additional hole, said bounding means including at least one lining on each of said blade parts, said lining being exchangeably connected with the remainder of the respective blade part, and at least one nut threaded onto said additional bolt and engaging said one blade part at said additional hole, at least one of said aligned holes in each of said sets being constituted by a slot which is elongated in the direction normal to said parting plane.

2. The scraper blade assembly as defined in claim 1, wherein said one overlapping portion of the respective set is provided on a first of said blade parts and the respectively second of said blade parts has at least another of said overlapping portions and means for bounding a recess juxtaposed with the latter and receiving said one overlapping portion.

3. The scraper blade assembly as defined in claim 1, wherein said additional bolt is of one piece with said other blade part.

4. The scraper blade assembly as defined in claim 3, wherein at least said other blade part is a forged product; and wherein said additional bolt is constituted by an integrally forged portion of said other blade part.

5. The scraper blade assembly as defined in claim 1, wherein said other blade part has an auxiliary hole aligned with said additional hole; and wherein said additional bolt is separate from said other blade parts and has a head at the end of said auxiliary hole which is remote from said parting plane and a stem extending from said head through said auxiliary hole into said additional hole.

6. The scraper blade assembly as defined in claim 5, wherein said head is non-circular in cross-section; and wherein said other blade part includes abutment means at that end of said auxiliary hole which is remote from said parting plane, said abutment means cooperating with said non-circular head in preventing said additional bolt from rotating in said auxiliary hole.

7. The scraper blade assembly as defined in claim 6, wherein said head is substantially rectangular in cross-section; and wherein said abutment means includes a pair of abutment surfaces extending longitudinally of said other blade part and engaging said rectangular head.

8. The scraper blade assembly as defined in claim 1, wherein said additional hole in said one blade part has an enlarged end portion at that end thereof which is remote from said parting plane for recessedly receiving said nut.

9. The scraper blade assembly as defined in claim 1, wherein said additional bolt extends across at least one of said openings and has at least one lateral recess which is aligned with and forms a continuation of said one opening.

10. The scraper blade assembly as defined in claim 1, wherein said nut has a self-locking threaded insert.

11. The scraper blade assembly as defined in claim 1, wherein said additional hole, additional bolt, and nut are disposed centrally between said sets of overlapping portions.

12. The scrapper blade assembly as defined in claim 1, wherein said additional hole, said additional bolt, and said nut together form a connecting unit; wherein said connecting means further includes an additional connecting unit similar to said cionnecting unit; and wherein said connecting units are arranged symmetrically with respect to and at a spacing from a central plane which halves the distance between said sets of overlapping portions.

13. A scraper blade assembly for use in a scraper chain conveyor including at least one centrally disposed chain consisting of a plurality of consecutive links, especially in a double central chain conveyor, comprising two discrete elongated scraper blade parts each substantially disposed at one side of a parting plane, said blade parts having at least two sets of mutually overlapping portions, said sets being spaced from one another longitudinally of said blade parts and at least one of said overlapping portions of each of said sets extending across said parting plane; means for bounding on each of said blade parts at least one pair of channels situated between said sets and opening onto said parting plane, the associated channels on said two blade parts complementing each other into confining openings for portions of a respective central chain link extending along said parting plane at a spacing longitudinally of said blade parts; and means for connecting said blade parts to one another, including aligned through holes in each of said sets, extending along said parting plane and transversely to the blade parts elongations, connecting bolts extending through said holes, at least one additional hole in one of said blade parts situated between said sets and extending substantially normal to said parting plane, at least one additional bolt connected to the other of said blade parts and extending across said parting plane into said additional hole, and at least one nut threaded onto said additional bolt and engaging said one blade part at said additional hole, said bounding means including at least one lining on each of said blade parts, said lining being exchangeably connected with the remainder of the respective blade part.

14. The scraper blade assembly as defined in claim 13, wherein said lining includes a pair of semi-annular portions each bounding one of said channels, and a flat connecting portion interconnecting said semi-annular portions.

15. The scraper blade assembly as defined in claim 14, wherein said connecting portion has a through bore therein for the passage of said additional bolt therethrough.

16. The scraper blade assembly as defined in claim 13; and further comprising means for detachably connecting said lining to said remainder of the respective blade part, including at least one pin connected to said lining and to said remainder.

17. The scraper blade assembly as defined in claim 13; and further comprising means for detachably connecting said lining to said remainder of the respective blade part, including a welded connection at least at the edge zone of the interface between said lining and said remainder.

* * * * *